E. A. AND E. G. SPERRY.
LUBRICATING AND COOLING SYSTEM FOR GYROSCOPES.
APPLICATION FILED SEPT. 16, 1918.
1,387,018. Patented Aug. 9, 1921.
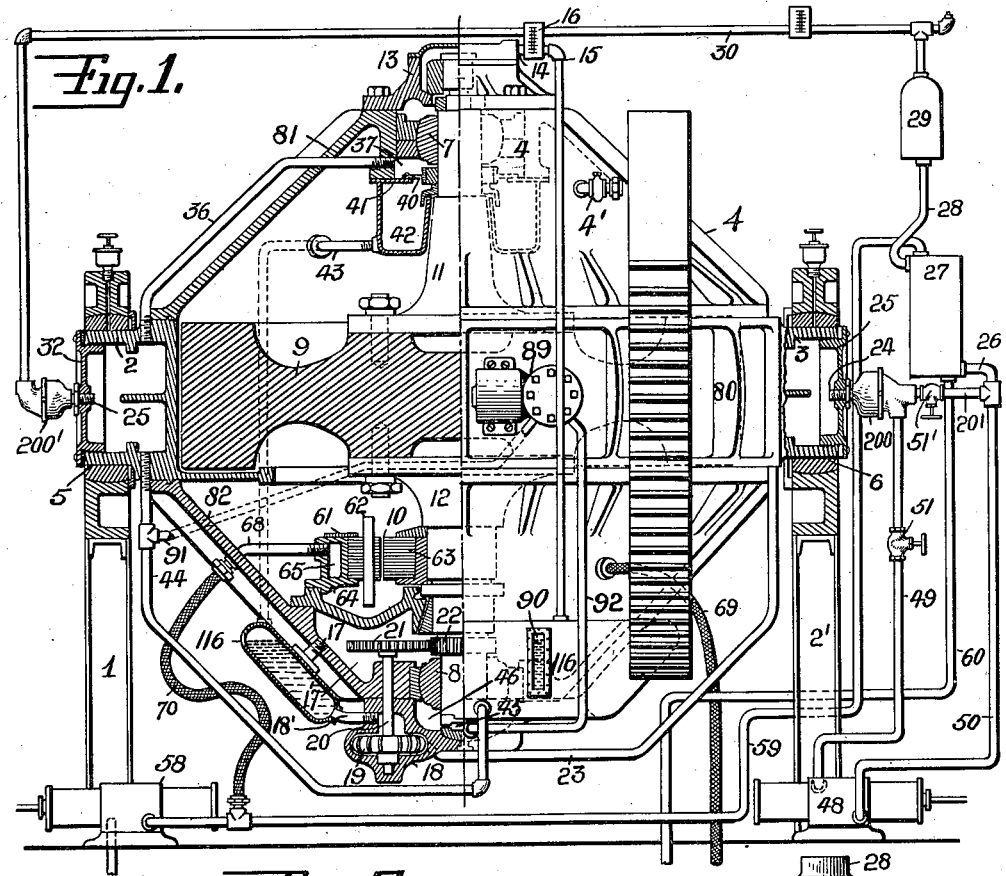
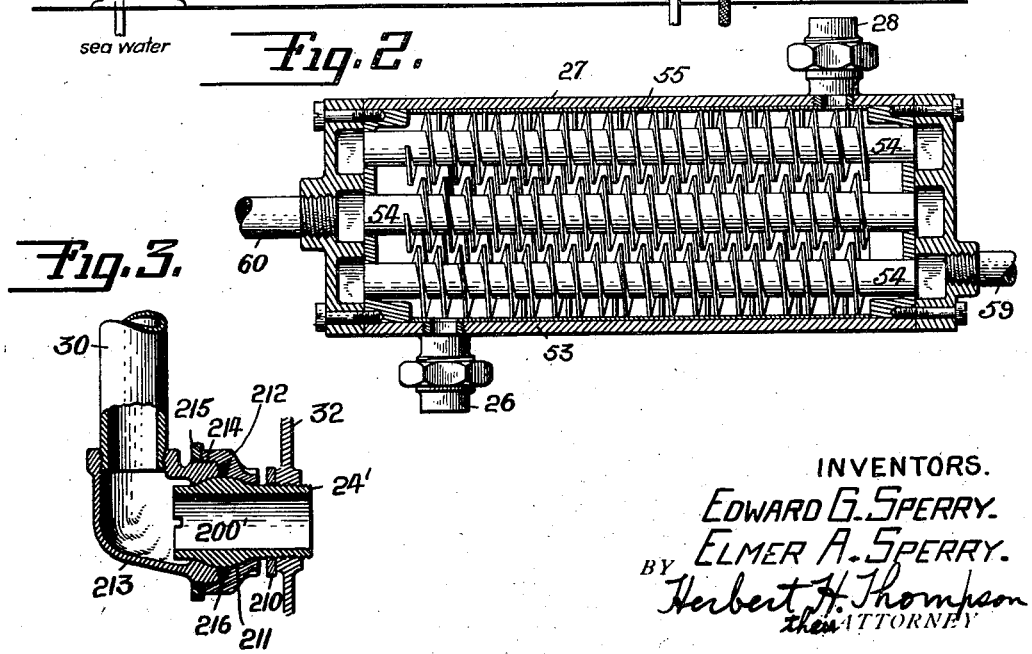
INVENTORS.
EDWARD G. SPERRY.
ELMER A. SPERRY.
BY Herbert H. Thompson
their ATTORNEY

UNITED STATES PATENT OFFICE.

ELMER A. SPERRY AND EDWARD G. SPERRY, OF BROOKLYN, NEW YORK, ASSIGNORS TO THE SPERRY GYROSCOPE COMPANY, OF BROOKLYN, NEW YORK, A CORPORATION OF NEW YORK

LUBRICATING AND COOLING SYSTEM FOR GYROSCOPES.

1,387,018. Specification of Letters Patent. Patented Aug. 9, 1921.

Application filed September 16, 1918. Serial No. 254,342.

*To all whom it may concern:*

Be it known that we, ELMER A. SPERRY and EDWARD G. SPERRY, citizens of the United States of America, residing at Brooklyn, in the county of Kings and State of New York, have invented certain new and useful Improvements in Lubricating and Cooling Systems for Gyroscopes, of which the following is a specification.

This invention relates to a cooling and lubricating system for bearings and other driven parts of heavy, high speed, continuously operating machinery. The invention is especially designed for stabilizing gyroscopes for ships. The rotors of such gyroscopes are of extremely large size and are designed to be operated continuously and at maximum speed.

The invention further relates to an improved cooling system for the driving motor which is preferably located within the evacuated casing of the gyroscope.

Referring to the drawings in which a preferred construction of the invention is shown:

Figure 1 is an elevation partly in section of the gyroscope.

Fig. 2 is a sectional view of the cooling means for the oil.

Fig. 3 is a fragmentary enlarged sectional detail view of one of the swivel joints employed.

The gyroscope is shown as mounted on heavy brackets 1 and 2'. Large hollow trunnions 2 and 3 extend from opposite sides of the casing 4 of the gyroscope and are journaled on bearings 5 and 6 in said brackets. The casing 4 supports the bearings 7 and 8 for the rotor and also serves to inclose completely the rotor 9, the motor 10 for driving the same and all other rotating parts of the gyroscope. A valve and coupling 4' are shown on the casing for the purpose of connecting an exhaust pump to evacuate the casing. The casing is shown as built up of a plurality of sections comprising a central annulus 80 carrying the trunnions 2 and 3 and a pair of conical end portions 81 and 82. The rotor 9 is shown as securely bolted at each side to stub shafts 11 and 12. Shaft 11 is journaled adjacent its upper end in the bearing 7. A cap 13 may be provided for the bearing, said cap being provided with an oil outlet 14, from which a pipe 15 leads. Said pipe is preferably provided with a peep sight 16 so that the operator may ascertain whether or not oil is flowing through the pipe. The pipe 15 is shown as leading downwardly into a reservoir 116 adjacent the bottom of the gyroscope. Similarly the lower bearing 8 is provided with an outlet or overflow opening 17 which leads into the reservoir 116. From the reservoir 116 the oil passes to an oil pump 18 through pipe 18'. The pump is shown in the form of a centrifugal pump having a turbine wheel 19 mounted on the same shaft 20 with a gear 21. Said gear meshes with a gear 22 on the shaft 12 of the gyroscope so that the pump is continuously driven. From the pump the oil is led through a pipe 23 into the hollow trunnion 3 of the gyroscope. From thence the oil passes out through a pipe 24 secured to the cap 25, rigidly fixed to trunnion 3 from whence the oil normally passes through a swivel joint 200, through pipes 201, 26 into and through the oil cooler 27 hereinafter described. A peep sight 90 may also be provided for reservoir 116. A valve 51' is preferably provided in pipe 201.

From the cooler the oil passes through pipe 28 into and through a strainer 29. From thence the oil is shown as passing through a pipe 30 through the swivel joint 200' into the hollow trunnion 2 through the fixed cap 32. By leading the oil from the stationary parts to the gyroscope through the trunnions in this manner a ready means is provided for introducing a continuous supply of oil or other liquid to the gyroscope without the use of flexible connections. From the interior of trunnion 2 a portion of the oil is led through a pipe 36 into a chamber 37 under the upper bearing 7. Since the oil is under pressure it flows up through the said bearing along the shaft and out at the opening 14 and pipe 15. The sight 16 will show at a glance whether the bearing is immersed in oil or not. The shaft 11 is provided with a disk 40 which closely fits and slides over a plate 41 on the gyroscope casing so that little if any oil escapes into the gyroscope. What little oil does trickle through is caught by the annular basin 42 from whence it is carried through the pipe 43 to the reservoir 116. Oil is supplied to the lower bearing from trunnion 2 through pipe 44. The thrust bearing 45 which supports the gyro-rotor is supplied with oil under much higher pressure from an electrically driven pump 89 shown as mounted on the gyro-casing 4. Said pump is fed from trunnion 2, being shown connected to pipe 44 through a branch pipe 91. From the pump, the oil is led into the thrust bearing through pipe 92. The oil is preferably under sufficient pressure to entirely support the shaft 12 and all parts secured thereto thus furnishing an oil thrust bearing for the shaft. From the said bearing the oil escapes into chamber 46 from whence it is forced up along the shaft 12 together with the oil from pipe 44 through the bearing 8 and into the space 17'.

In order to secure a complete circulation of the oil at the time the gyroscope is started, we prefer to provide an auxiliary oil pump 48 which is connected to the system through pipes 49 and 50. When the pump 48 is operating the valve 51' may be closed and valve 51 opened.

The oil cooler 27 may be constructed as shown in Fig. 2. Said cooler is shown as comprising casing 53 within which are placed a plurality of pipes 54 through which a supply of cooling liquid such as sea water is continuously pumped. The entire casing 27 around the pipe is adapted to be filled with the oil and circulates in and around the pipes and spiral ribs 55, as will be readily apparent. By providing a much greater surface for the oil than for the water we secure a maximum cooling effect on account of the conductivity of the oil being less than that of water. The water for the cooler may be supplied from a pump 58 which is shown as connected with the cooler through a pipe 59. From the cooler the water flows through the waste pipe 60.

In gyroscopes of this character much power is saved if the casing surrounding the rotor is evacuated. When this is done however serious trouble arises through the overheating of the motor used to drive the same. The motor is shown in the form of an induction motor having a stator 61 secured to the casing and provided with windings 62. The rotor 63 is preferably without windings and is shown as mounted directly upon the shaft 12. In order to cool the stator and its windings we prefer to provide the metallic frame 64 supporting the same with a channel 65, which preferably extends circumferentially around the frame. Cooling fluid is introduced into the said channel through a pipe 68 which said fluid is led outwardly from the gyroscope through the flexible pipe or hose 69. The same pump 58 referred to may be used to supply sea water for cooling the motor; said pump being shown as connected to the pipe 68 through a flexible hose 70.

The operation of our invention is as follows:

Before or at the time the gyroscope is started up the oil pumps 48 and 89 are started to cause a circulation of the oil through all of the bearings. The operator by observing the peep sights 16 and 90 may readily determine when the oil has completely flooded the bearings. As the gyroscope comes up to speed the pump 18 will exert more and more pressure until the pump 48 may be entirely shut off and valve 51 closed, if desired. Auxiliary pump 89 is kept running.

Before or at the time the pump 48 is started the water pump 58 is also set in operation to supply cooling water to both the oil cooler 27 and the motor 10 within the casing. While, as shown, only the oil is carried into the gyroscope through the hollow trunnions, it will be understood that the described method may be employed for other purposes, if desired.

A preferred construction of the swivel joints 200, 200', referred to above, is shown in detail in Fig. 3 which shows the joint 200'. The pipe 24' is screwed into the cap 32 in such a position as to be coaxial with the trunnion 2. A lock nut 210 may be provided for preventing relative movement of said pipe 24' and cap 32. The last mentioned pipe is provided with a substantially spherical portion 211 adapted to seat rotatably in spherical recesses found in telescoping members 212, 213. The latter are shown provided with coacting screw threads 214 whereby they may be adjusted in an axial direction to regulate the clearance between them and said portion 211. Packing 216 may be provided between said members 212, 213 to prevent leakage of the oil or other fluid and a lock nut 215 may be provided to hold said members in adjusted relative position. The member 213 is shown in the form of an L connected at one end to the pipe 30. The corresponding member of the joint 200 is shown in the form of a T connected to pipes 49 and 201.

In accordance with the provisions of the patent statutes, we have herein described the principle of operation of our invention, together with the apparatus, which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. The combination with a gyroscope having a rotor shaft, journal bearings therefor and other bearings for supporting the gyroscope for oscillation about an axis, of an oil circulatory system for said bearings comprising a reservoir adjacent the axis of said other bearings, direct and return conduits leading from said reservoir to said journal bearings, and a pump for circulating the oil.

2. The combination with a gyroscope having a rotor shaft, journal bearings therefor and other bearings for supporting the gyroscope for oscillation about an axis, of an oil circulatory system for said bearings comprising a reservoir adjacent the axis of said other bearings, direct and return conduits leading from said reservoir to said journal bearings, an extraneous pump for circulating the oil and connecting ducts leading into the gyroscope along the axis of said other bearings and into said reservoir.

3. The combination with a gyroscope having a rotor shaft, journal bearings therefor and other bearings for supporting the gyroscope for oscillations about an axis, of an oil circulatory system for said bearings comprising a reservoir adjacent the axis of said other bearings, direct and return conduits leading from said reservoir to said journal bearings, a pump mounted on and driven by the gyroscope for circulating the oil, and an extraneous pump for circulating the oil while the gyroscope is starting up.

4. The combination with a gyroscope having a rotor and rotor bearings, of trunnions supporting said gyroscope for oscillation about an axis, an oiling system therefor comprising a pump, a conduit leading from the pump to and into a trunnion and a conduit leading to a bearing from said trunnion.

5. The combination with a gyroscope having a normally vertical rotor shaft, journal bearings therefor, and central horizontal gudgeon bearings for supporting the same for oscillation, of an oiling system for said bearings comprising a reservoir about the middle of the gyroscope, conduits leading from said reservoir to each of said journal bearings, an overflow reservoir adjacent the lower of said bearings, and connected with each of said bearings, and a pump for circulating the oil.

6. The combination with a shaft of a thrust bearing, a guide bearing, a casing inclosing both bearings, and a lubricating system therefor comprising a separate source of continuous oil supply for each bearing, said source of supply for the thrust bearing being under the greater pressure and said bearings being in communication with the oil escaping from the thrust bearing to assist in lubricating the guide bearings.

7. The combination of a shaft, a thrust bearing, a guide bearing, a casing inclosing both of said bearings, and a lubricating system which supplies lubricant under pressure to both bearings comprising a separate source of oil supply for each bearing, the supply for the thrust bearing being at a greater pressure than that for the guide bearing.

8. The combination with a rotor and rotor bearing frame mounted for oscillation about an axis other than the spinning axis of the rotor, of an oiling system for said rotor comprising an independently mounted pump and a connection from the pump leading into the bearing frame along said oscillatory axis.

9. The combination with a shaft, a thrust bearing and a guide bearing therefor, of means for supplying the latter with oil under pressure and means for raising oil to a greater pressure and for supplying the former bearing therewith.

10. The combination with a vertical shaft and bearing, of a lubricating system therefor comprising a pump, means connecting said pump with said bearing such that the oil circulates up through the bearing, and extraneous cooling means for the circulating oil.

11. The combination with a rotor and rotor bearing frame mounted for oscillation about an axis other than the spinning axis of the rotor, of an oiling system for said rotor, an oil circulating means, an extraneous cooling means for the oil and a connection from said means to the bearing frame along said oscillatory axis.

12. The combination with a gyroscope having a rotor and rotor bearings, of trunnions supporting said gyroscope for oscillation about an axis, an oiling system therefor comprising an extraneous oil cooler, a conduit leading from the cooler to and into a trunnion and a conduit leading to a bearing from said trunnion.

In testimony whereof we have affixed our signatures.

ELMER A. SPERRY.
EDWARD G. SPERRY.